(No Model.)
S. ARNOLD.
SHAFT BEARING TABLE LEG.
No. 446,576. Patented Feb. 17, 1891.
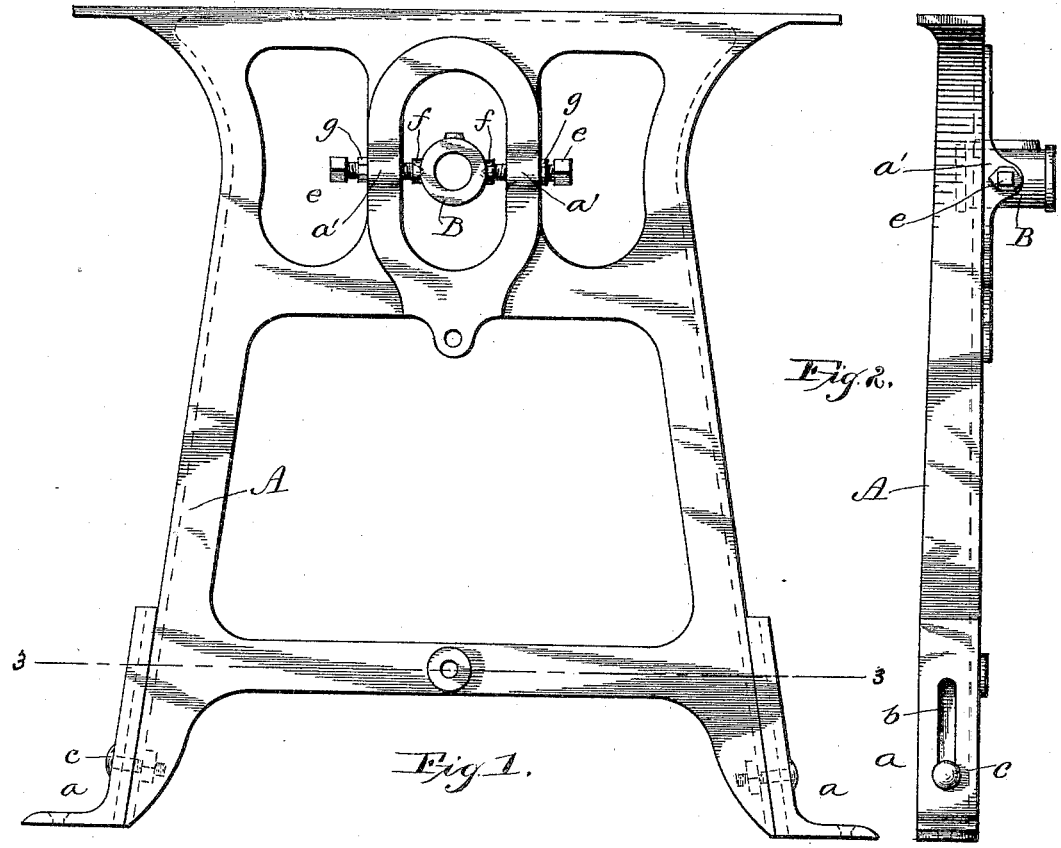
Witnesses:
A. W. Cushman.
Robert Court.
Inventor:
Satterlee Arnold,
by Henry Calver,
Atty.

UNITED STATES PATENT OFFICE.

SATTERLEE ARNOLD, OF MONTCLAIR, NEW JERSEY, ASSIGNOR TO ANNA M. ARNOLD, OF SAME PLACE.

SHAFT-BEARING TABLE-LEG.

SPECIFICATION forming part of Letters Patent No. 446,576, dated February 17, 1891.

Application filed October 21, 1890. Serial No. 368,841. (No model.)

*To all whom it may concern:*

Be it known that I, SATTERLEE ARNOLD, a citizen of the United States, residing at Montclair, in the county of Essex and State of New Jersey, have invented certain new and useful Improvements in Shaft-Bearing Table-Legs, of which the following is a specification, reference being had therein to the accompanying drawings.

In manufacturing establishments it is customary to mount a large number of small power-driven machines, such as sewing-machines, on a long table, beneath which is supported in suitable bearings a long power-shaft having pulleys for driving the said small machines. It is necessary for tables of this kind to stand solidly on the floors, and it is also necessary to provide beneath the tables suitable bearings for the power-shafts. These bearings have usually been formed in the iron legs of the tables; but much difficulty has been experienced in getting the table-legs to set solidly on the floors, which are generally more or less uneven, and in getting the bearings for the power-shaft in perfect alignment. To make the tables set evenly and solidly it has frequently been necessary to cut the floors somewhat.

My invention has for its object to provide legs for machine-supporting tables of such a construction as to obviate the difficulties above referred to. To this end my improved shaft-bearing table-legs are provided with independent feet adjustably attached to the legs in such manner as to permit them to be raised or lowered relatively to the legs, thus providing for vertical adjustment of the entire leg and of the shaft-bearing carried thereby or permitting one foot to be adjusted on a leg, so as to make the table rest solidly on the floor. The power-shaft bearings are preferably pivotally attached to the upper parts of the legs by supporting devices, which permit of the lateral or horizontal adjustment of the said bearings, so that with the vertical adjustment afforded by the adjustable feet a bearing is universally adjustable to bring the same into perfect alignment with the bearings on the other legs.

In the accompanying drawings, Figure 1 is a side view of my improved shaft-bearing table-leg. Fig. 2 is an edge view thereof; and Fig. 3 is a detail section on line 3 3, Fig. 1.

A denotes a cast-iron table-leg, provided at the opposite sides of its bifurcated base with independent feet $a$, which are vertically adjustable on the bifurcated leg. This adjustment is provided for, as herein shown, by forming a slot $b$ in the shank portion of the foot and attaching the foot to the leg by a bolt $c$, passing through said slot and through a hole in the lower part of the leg. By loosening the nut on the said bolt the foot will be free to be adjusted relatively to the leg, as may be desired, and when the nut is tightened the foot is rigidly secured in place. Of course this construction might be reversed by forming the slot in the lower part of the leg and passing the bolt through a hole in the shank of the foot, or the adjustable connection between the leg and the foot might be provided for by any other well-known construction, as by screwing the shank of the foot into the leg or into a socket or through lugs cast thereon.

To permit a single bolt to hold a foot securely in place, a vertical rib-and-groove connection is preferably formed between the leg and foot by casting a rib $d$ on the leg and forming a corresponding groove in the under or inner side of the shank of the foot, as more clearly shown in Fig. 3.

B denotes the shaft-bearing attached to the upper part of the leg. Said bearing is preferably pivotally supported on the leg by pointed center screws $e$, passing through lugs $a'$, cast on the leg and entering sockets formed in trunnions $f$ on the bearing B, said screws being provided with lock-nuts $g$ to secure them in any position to which they may be adjusted. It will be apparent that when the said lock-nuts are slackened the bearing may be adjusted laterally or horizontally by screwing one of the said screws out and the other in, thus bringing the said bearing into perfect alignment with a bearing on other legs, and as the pivotal supports of the said bearing permit of a self-leveling adjustment of the bearing, while the vertical adjustment of the independent feet on the legs affords means for raising and lowering the said bearing, it will be clear that such perfect alignment, both vertically and horizontally, as will prevent a shaft from binding in its bearings is fully provided for. The bearing B is preferably hung to the upper portion of the leg A, as shown, thus raising the power-shaft high enough, so that it will be convenient to sweep beneath the same, thereby avoiding an objection as to want of cleanliness, which results where the power-shafts are supported in low-down bearings in the table-legs.

I am aware that billiard and other tables have heretofore been provided with adjustable feet, by means of which they might be leveled or caused to set even on an uneven floor, and I do not, therefore, claim a table-leg with an adjustable foot, broadly; but

What I claim is—

1. A table-leg provided with a horizontally-adjustable shaft-bearing and having at the opposite sides of its bifurcated base independent vertically-adjustable feet, which may be raised and lowered as required, whereby the said bearing may be adjusted laterally and vertically to bring it into alignment, and whereby also the table may be leveled or caused to set firmly on an uneven floor.

2. A table-leg provided with a horizontally-adjustable shaft-bearing and having at its opposite sides independent vertically-adjustable feet, the shanks of which have rib-and-groove connections with the lower parts of said leg, combined with securing-bolts for attaching said feet in place.

In testimony whereof I affix my signature in presence of two witnesses.

SATTERLEE ARNOLD.

Witnesses:
R. E. SCHERMERHORN,
MARTIN MEEK.